United States Patent
Weston

(10) Patent No.: US 8,564,411 B2
(45) Date of Patent: Oct. 22, 2013

(54) BACK-DOOR DATA SYNCHRONIZATION FOR A MULTIPLE REMOTE MEASUREMENT SYSTEM

(75) Inventor: David Alan Weston, Hendersonville, NC (US)

(73) Assignee: Michelin Recherche et Technique, Granges-Paccot (CH)

( * ) Notice: Subject to any disclaimer, the term of this patent is extended or adjusted under 35 U.S.C. 154(b) by 728 days.

(21) Appl. No.: 12/515,087

(22) PCT Filed: Dec. 4, 2006

(86) PCT No.: PCT/US2006/046401
§ 371 (c)(1),
(2), (4) Date: Dec. 22, 2009

(87) PCT Pub. No.: WO2008/069792
PCT Pub. Date: Jun. 12, 2008

(65) Prior Publication Data
US 2010/0097192 A1   Apr. 22, 2010

(51) Int. Cl.
*H04Q 5/22* (2006.01)

(52) U.S. Cl.
USPC ..... 340/10.3; 340/4.11; 340/4.61; 340/12.22; 340/426.13; 340/426.18; 340/539.14; 340/539.17; 340/815.6; 340/989; 340/993; 340/994; 370/252; 370/503; 375/354; 375/356; 375/366; 375/369

(58) Field of Classification Search
USPC .............. 340/4.11, 4.61, 10.3, 12.22, 426.13, 340/426.18, 539.14, 539.17, 815.6, 989, 340/993, 994; 370/252, 503; 375/354, 356, 375/366, 369
See application file for complete search history.

(56) References Cited

U.S. PATENT DOCUMENTS

| | | | |
|---|---|---|---|
| 3,440,617 A * | 4/1969 | Lesti | 382/224 |
| 3,760,351 A | 9/1973 | Thomas | |
| 3,941,930 A * | 3/1976 | Mohri et al. | 348/525 |
| 4,061,200 A | 12/1977 | Thompson | |
| 4,255,789 A * | 3/1981 | Hartford et al. | 701/108 |
| 4,346,343 A * | 8/1982 | Berndlmaier et al. | 323/282 |
| 4,383,216 A * | 5/1983 | Dorler et al. | 323/282 |

(Continued)

FOREIGN PATENT DOCUMENTS

| | | |
|---|---|---|
| EP | 409230 A2 * | 1/1991 |
| EP | 1 486 357 | 12/2004 |

(Continued)

OTHER PUBLICATIONS

PCT International Search Report for PCT/US06/46401, dated Mar. 13, 2008.

(Continued)

*Primary Examiner* — George Bugg
*Assistant Examiner* — Paul Obiniyi
(74) *Attorney, Agent, or Firm* — Dority & Manning, P.A.

(57) ABSTRACT

Disclosed is an apparatus and methodology for synchronizing data received at a central location that has been collected at plural remote locations and separately transmitted to the central location. A plurality of remote sensors is provided and configured to be simultaneously triggered to begin a data collection sequence and to subsequently transmit the collected data along with remote sensor identification data and timing information to the central location. Timing information may include a specifically transmitted time reference or may be derived based on successive transmissions from the individual remote sensors.

13 Claims, 2 Drawing Sheets

(56) References Cited

U.S. PATENT DOCUMENTS

| | | | |
|---|---|---|---|
| 4,462,022 A * | 7/1984 | Stolarczyk | 340/506 |
| 4,510,484 A | 4/1985 | Snyder | |
| 4,546,649 A * | 10/1985 | Kantor | 73/168 |
| 4,661,804 A * | 4/1987 | Abel | 340/539.17 |
| 4,737,770 A * | 4/1988 | Brunius et al. | 340/539.22 |
| 4,761,648 A * | 8/1988 | Ellis | 340/12.17 |
| 4,772,876 A * | 9/1988 | Laud | 340/539.22 |
| 4,860,216 A * | 8/1989 | Linsenmayer | 342/159 |
| 4,862,486 A | 8/1989 | Wing et al. | |
| 5,046,035 A * | 9/1991 | Jigour et al. | 708/232 |
| 5,099,477 A * | 3/1992 | Taniguchi et al. | 370/501 |
| 5,200,743 A * | 4/1993 | St. Martin et al. | 340/3.51 |
| 5,457,447 A | 10/1995 | Ghaem et al. | |
| 5,749,984 A | 5/1998 | Frey et al. | |
| 5,757,870 A * | 5/1998 | Miya et al. | 375/367 |
| 5,818,869 A * | 10/1998 | Miya et al. | 375/150 |
| 5,964,816 A * | 10/1999 | Kincaid | 701/45 |
| 6,580,364 B1 | 6/2003 | Munch et al. | |
| 6,650,660 B1 * | 11/2003 | Koehler et al. | 370/503 |
| 6,658,928 B1 * | 12/2003 | Pollack et al. | 73/146 |
| 6,662,099 B2 * | 12/2003 | Knaian et al. | 701/117 |
| 6,725,713 B2 | 4/2004 | Adamson et al. | |
| 6,865,189 B2 * | 3/2005 | Senthil et al. | 370/466 |
| 6,888,453 B2 * | 5/2005 | Lutz et al. | 340/506 |
| 6,895,305 B2 * | 5/2005 | Lathan et al. | 700/245 |
| 6,927,686 B2 * | 8/2005 | Nieters et al. | 340/539.22 |
| 6,957,110 B2 * | 10/2005 | Wewalaarachchi et al. | 700/86 |
| 7,013,578 B2 * | 3/2006 | Wunderlin et al. | 34/528 |
| 7,187,299 B2 * | 3/2007 | Kunerth et al. | 340/870.05 |
| 7,250,853 B2 * | 7/2007 | Flynn | 340/506 |
| 7,336,154 B2 * | 2/2008 | Friedrich | 340/10.2 |
| 7,440,872 B2 * | 10/2008 | Bondarev et al. | 702/188 |
| 7,477,637 B2 * | 1/2009 | Koehler et al. | 370/351 |
| 7,478,486 B2 * | 1/2009 | Wunderlin et al. | 34/491 |
| 7,675,412 B2 * | 3/2010 | Adra | 340/539.13 |
| 7,760,675 B2 * | 7/2010 | Sakai et al. | 370/311 |
| 7,761,532 B2 * | 7/2010 | Moriwaki | 709/217 |
| 7,764,171 B2 * | 7/2010 | Cheng et al. | 340/539.26 |
| 7,782,804 B2 * | 8/2010 | Albert et al. | 370/278 |
| 7,796,680 B2 * | 9/2010 | Matsumoto et al. | 375/148 |
| 7,881,684 B2 * | 2/2011 | Nakagawa et al. | 455/131 |
| 7,948,373 B2 * | 5/2011 | Bauer et al. | 340/539.22 |
| 7,962,305 B2 * | 6/2011 | Tiegs | 702/122 |
| 7,978,067 B2 * | 7/2011 | Wagner et al. | 340/539.26 |
| 8,020,453 B2 * | 9/2011 | Kreit et al. | 73/862.331 |
| 8,050,042 B2 * | 11/2011 | Kollipara et al. | 361/760 |
| 8,169,311 B1 * | 5/2012 | Breed | 340/438 |
| 2001/0001234 A1 * | 5/2001 | Addy et al. | 340/531 |
| 2001/0005406 A1 * | 6/2001 | Mege et al. | 375/354 |
| 2002/0001043 A1 * | 1/2002 | Lee | 348/512 |
| 2002/0011932 A1 * | 1/2002 | Rodgers et al. | 340/572.1 |
| 2002/0033757 A1 * | 3/2002 | Rodgers et al. | 340/572.1 |
| 2002/0120362 A1 * | 8/2002 | Lathan et al. | 700/245 |
| 2002/0125998 A1 * | 9/2002 | Petite et al. | 340/286.01 |
| 2002/0193888 A1 * | 12/2002 | Wewalaarachchi et al. | 700/9 |
| 2003/0016128 A1 * | 1/2003 | Lutz et al. | 340/517 |
| 2003/0040279 A1 * | 2/2003 | Ballweg | 455/66 |
| 2003/0090375 A1 * | 5/2003 | Addy et al. | 340/531 |
| 2004/0113773 A1 * | 6/2004 | Nieters et al. | 340/539.22 |
| 2004/0200093 A1 * | 10/2004 | Wunderlin et al. | 34/606 |
| 2005/0212661 A1 * | 9/2005 | Friedrich | 340/10.5 |
| 2006/0025897 A1 * | 2/2006 | Shostak et al. | 701/1 |
| 2006/0139162 A1 * | 6/2006 | Flynn | 340/521 |
| 2006/0191161 A1 * | 8/2006 | Wunderlin et al. | 34/562 |
| 2006/0229746 A1 * | 10/2006 | Ollis et al. | 700/65 |
| 2006/0230270 A1 * | 10/2006 | Goffin | 713/173 |
| 2006/0267731 A1 * | 11/2006 | Chen | 340/10.1 |
| 2006/0287822 A1 * | 12/2006 | Twitchell et al. | 701/213 |
| 2007/0060079 A1 * | 3/2007 | Nakagawa et al. | 455/131 |
| 2007/0083294 A1 * | 4/2007 | Bruno | 700/295 |
| 2007/0203768 A1 * | 8/2007 | Adra | 705/7 |
| 2007/0241955 A1 * | 10/2007 | Brosche | 342/128 |
| 2009/0039874 A1 * | 2/2009 | Kreit et al. | 324/207.17 |
| 2009/0268786 A1 * | 10/2009 | Matsumoto et al. | 375/148 |
| 2010/0001718 A1 * | 1/2010 | Howard et al. | 324/207.15 |
| 2010/0225447 A1 * | 9/2010 | Adra | 340/10.1 |
| 2011/0092223 A1 * | 4/2011 | Nakagawa et al. | 455/456.1 |

FOREIGN PATENT DOCUMENTS

| | | |
|---|---|---|
| EP | 1681660 A1 * | 7/2006 |
| EP | 1681660 A1 | 7/2006 |
| FR | 2811263 | 7/2001 |
| FR | 2811263 A1 * | 1/2002 |
| GB | 2171525 A | 8/1986 |
| WO | WO 95/33184 | 12/1995 |

OTHER PUBLICATIONS

Extended European Search Report for EP 06839011.1-2425, dated Jan. 31, 2012.

* cited by examiner

BACK-DOOR DATA SYNCHRONIZATION FOR A MULTIPLE REMOTE MEASUREMENT SYSTEM

FIELD OF THE INVENTION

The present subject matter relates to remote measurement systems and methodologies. More particularly, the present subject matter is directed to post measurement synchronization of signals from multiple remote sources.

BACKGROUND OF THE INVENTION

The incorporation of electronic devices with tire structures yields many practical advantages. Tire electronics may include sensors and other components for obtaining information regarding various physical parameters of a tire, such as temperature, pressure, number of tire revolutions, vehicle speed, etc. Such performance information may become useful in tire monitoring and warning systems, and may have potential use as a part of a feedback system to regulate or control certain tire and/or vehicle related systems.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system.

U.S. Pat. No. 4,862,486 (Wing et al.) also relates to tire electronics, and more particularly discloses an exemplary revolution counter for use in conjunction with automotive and truck tires.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles could be tracked using RF tag transmission, exemplary aspects of which are disclosed in U.S. Pat. No. 5,457,447 (Ghaem et al.).

Such integrated tire electronics systems have conventionally been powered by a variety of techniques and different power generation systems. Examples of mechanical features for generating energy from tire movement are disclosed in U.S. Pat. No. 4,061,200 (Thompson) and U.S. Pat. No. 3,760,351 (Thomas). Such examples provide bulky complex systems that are generally not preferred for incorporation with modern tire applications. Yet another option for powering tire electronics systems is disclosed in U.S. Pat. No. 4,510,484 (Snyder), which concerns a piezoelectric power supply symmetrically configured about a radiating centerline of a tire.

Another known method for deriving power for tire monitoring systems relates to piezoelectric generators that harvest energy produced by the rotation of a host tire. U.S. Pat. No. 6,725,713 discloses a system for generating electric power from a rotating tire's mechanical energy that employs a piezoelectric structure and an energy storage device.

The disclosures of all the forgoing United States patents are herby fully incorporated into this application for all purposes by reference thereto.

While various implementations of tire related data collection and transmission systems and methodologies have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved apparatus and methodology for synchronizing measurement signals from multiple remote sensors has been developed.

In an exemplary configuration, apparatus and methodologies are disclosed for synchronizing signals transmitted from multiple sensors mounted within plural tire structures and/or at plural locations within a single tire.

In one of its simpler forms, measurement or data acquisition activity is initiated simultaneously at plural sensors located within different tire structures.

In accordance with aspects of certain embodiments of the present subject matter, methodologies are provided to store acquired data within the sensors for later transmission to a central location for analysis.

In accordance with certain aspects of other embodiments of the present subject matter, methodologies have been developed to synchronize acquired data from plural sensors having multiple independent clock speeds.

In accordance with yet additional aspects of further embodiments of the present subject matter, methodologies have been developed to insure accurate transmission of acquired data from plural location so as to overcome potential collisions or interference from other signal sources.

In accordance with yet still further aspects of certain embodiments, methodologies are provided to provide divergent measurements including single events, multiple events or continuous measurements for predetermined time intervals.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

Further, it should be appreciated that while the present subject matter has been generally described with reference to measurement of tire related events or phenomena, such is not a requirement of the subject matter as the methodologies disclosed herein may clearly be applied to any measurement environment where is may be desired or important to obtain concurrent or simultaneous measurements from plural locations. As non-limiting examples, simultaneous measurements from plural geological sensors placed over a land area to be monitored for natural or induced vibrations or other phenomena may be desired. Alternatively, simultaneous measurements from plural locations within a building or ship structure may be monitored. Further still, optical measurements using, for example, digital optical equipment, may be used to simultaneously record an event or object to permit evaluation of a single moment in time from plural view points. Such exemplary uses for the present subject matter may well lead those of ordinary skill in the art to additional uses of the presently disclosed subject matter and all such uses are envisioned to be encompassed by the appended claims.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
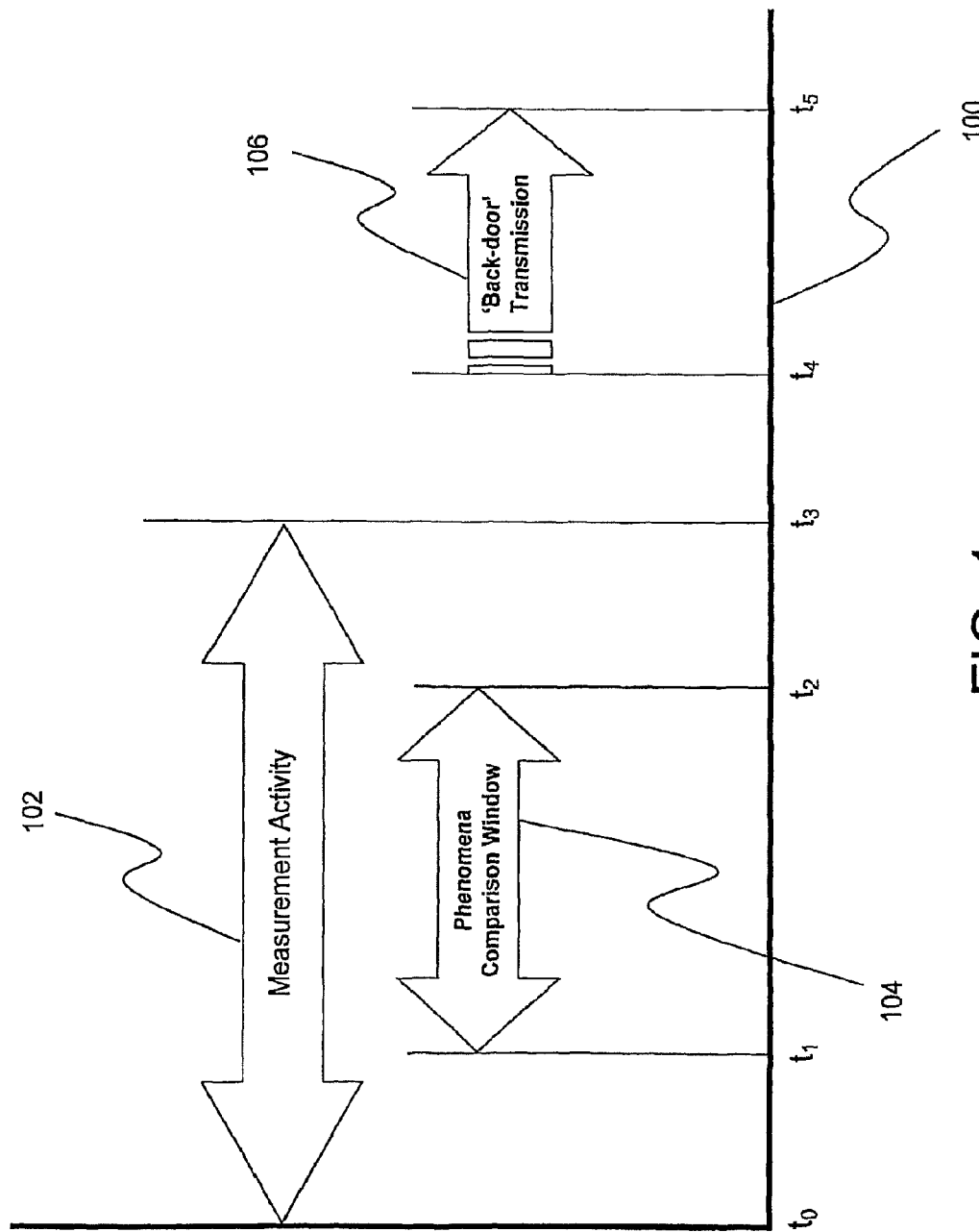
FIG. 1 schematically illustrates a first exemplary embodiment of the present subject matter employing "back door" transmission of measurement signals from plural sources.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with an improved apparatus and methodology for synchronizing measurement signals from multiple remote sensors.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

In some measurement systems, the results of multiple remote measurements must be compared in a precise common time window to obtain proper phenomena understanding or interpretation. Certain operating constraints, however, may present challenges to accurately transmitting measurement data to a single central receiver for data acquisition and processing from plural sensors. Non-limiting exemplary data transmission challenges include interference by way of transmission collisions from plural transmitters and other types of interference that may inhibit accurate signal or data reception at a central processor.

Thus there is a need to provide a methodology for providing data signal transmission from plural independent, remote sensors of single data events, multiple data events, or data streams in such a manner that data received at a central location can be compared in the same time frame or measurement time window with respect to each individual remote sensor. Further, there must be provided a methodology for addressing the fact that the measurements may not or cannot be transmitted simultaneously or in real time. The present subject matter discloses methodologies to address such issues.

Reference will now be made in detail to the presently preferred embodiments of the subject synchronization methodology. Referring now to the drawings, FIG. 1 schematically illustrates a first embodiment of the present subject matter employing after-the-fact or "back door" transmission of measurement signals from plural remote sensors in accordance with the present technology.

Referring more specifically to FIG. 1, it will be seen that there is illustrated a time line 100 representing events associated with a measurement activity 102. As suggested herein above, measurement activity 102 occurring between times $t_0$ and $t_3$ may be associated with a large number of differing events occurring in significantly different environments. Further such events may occur within a phenomena comparison window 104 occurring between times $t_1$ and $t_2$.

It should be appreciated by those of ordinary skill in the art that the various time markers and their relative locations on time line 100 are not intended to be scaled in any fashion to limit the scope of the present disclosure. More specifically, no specific time scale has been indicated as the actual time periods may vary significantly depending on the specific data to be measured or recorded. Nor should inferences be placed on the fact that FIG. 1 illustrates displacements between times $t_0$, $t_1$, $t_2$, and $t_3$. In practical operation of the present subject matter, times $t_0$ and $t_1$ may or may not occur simultaneously as may or may not times $t_2$ and $t_3$. Further, the simultaneous occurrence of times $t_0$ and $t_1$ does not necessarily require the simultaneous occurrence of times $t_2$ and $t_3$ or vice-versa. Generally time $t_4$, associated with the beginning of back-door transmission period 106, follows time $t_3$ by some period of time although such period may be very short or non-existing.

For purposes of illustration only, the present subject matter will be described in relationship to the measurement of tire related phenomena. Such tire related phenomena may include as non-limiting examples only, tire pressure, temperature, speed of rotation, direction of rotation, revolution count, and deflection. In addition, additional tire related data may be included with any data transmission including such information as tire manufacturing location and date, stored tire mounting location on a vehicle and any other tire specific information as may be desired. It should be specifically borne in mind that the exact nature of the specifically measured and transmitted data does not constitute a limitation on the present subject matter.

With further reference to FIG. 1, it will be notice that Measurement Activity 102 generally may occur starting at time $t_0$ and extends up to time $t_3$. Within this time period, a Phenomena Comparison Window 104 exists from time $t_1$ to $t_2$ during which time one or more events or series of events may occur at one location that are to be compared with a similar event or events that may occur at another or multiple other locations. In the exemplary embodiment of tire related phenomena, a single event might correspond to measurement of tire pressure or speed at a particular moment in time. Other events such as recording a time at which a tire may have passed over one or more cleats along the travel path of the vehicle may be compared.

In accordance with the present subject matter, it is recognized that in order to compare events occurring within a comparison window, a methodology must be developed to transmit data from a plurality of remote location in a manner such that the data may be compared. The provision of such a methodology lies at the heart of the present subject matter and is herein referred to as a "back-door" or after-the-fact time synchronization of multiple time-based measurements. Such methodology may be provided through the use of independent remote sensors 200 as illustrated in FIG. 2.

Figure 2:
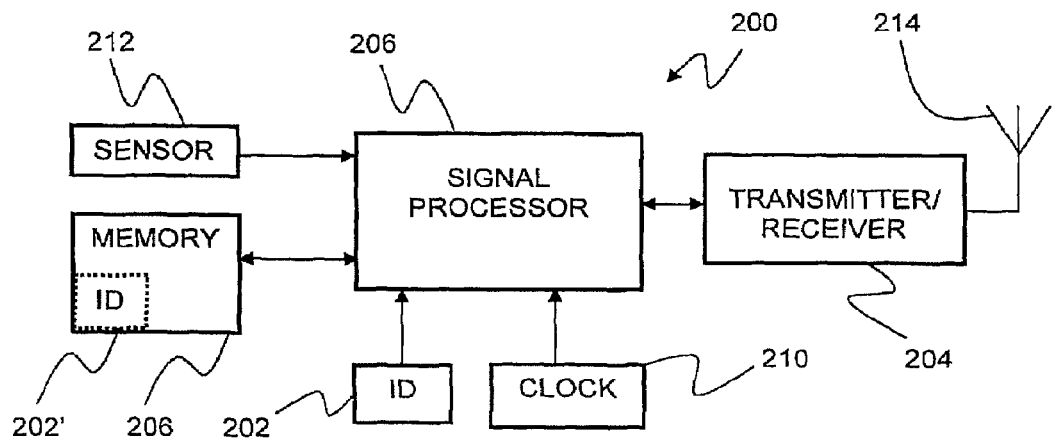
FIG. 2 schematically illustrates an exemplary individual remote sensor configuration for measuring, recording, and transmitting information regarding monitored events and other data.

In accordance with the present subject matter and as illustrated in FIG. 2, each independent remote sensor 200 is associated with a unique identification ID (RFID) 202, a transmitter/receiver (TX/RX) 204 with an associated antenna 214 for transmission and reception of signals, a signal processor 206, a memory 208, a local clock 210 and one or more sensors collectively illustrated as transducer 212.

Transducer 212 may correspond to a single piezoelectric sensor, a pressure responsive sensor or other sensor types or combinations thereof. Further, ID 202 may correspond to identification data stored in a dedicated memory or to data 202' stored in a portion of memory 206. Further still, memory 206 may correspond to a portion of memory within signal processor 206 whose other portion may correspond to a storage area for signal processing and control software used to direct the operation of remote sensor 200.

Power for operating remote sensor 200 may be derived from incorporated piezoelectric devices, batteries or other sources. In the instance that transducer 212 corresponds to a piezoelectric device, such device, along with any piezoelectric power generating device may be formed from exemplary piezoelectric materials that may include quartz, barium titanate, cadmium sulfide, lead zirconate titanate (PZT), polyvinylidene fluoride (PVDF), and polyvinyl chloride (PVC).

Figure 3:
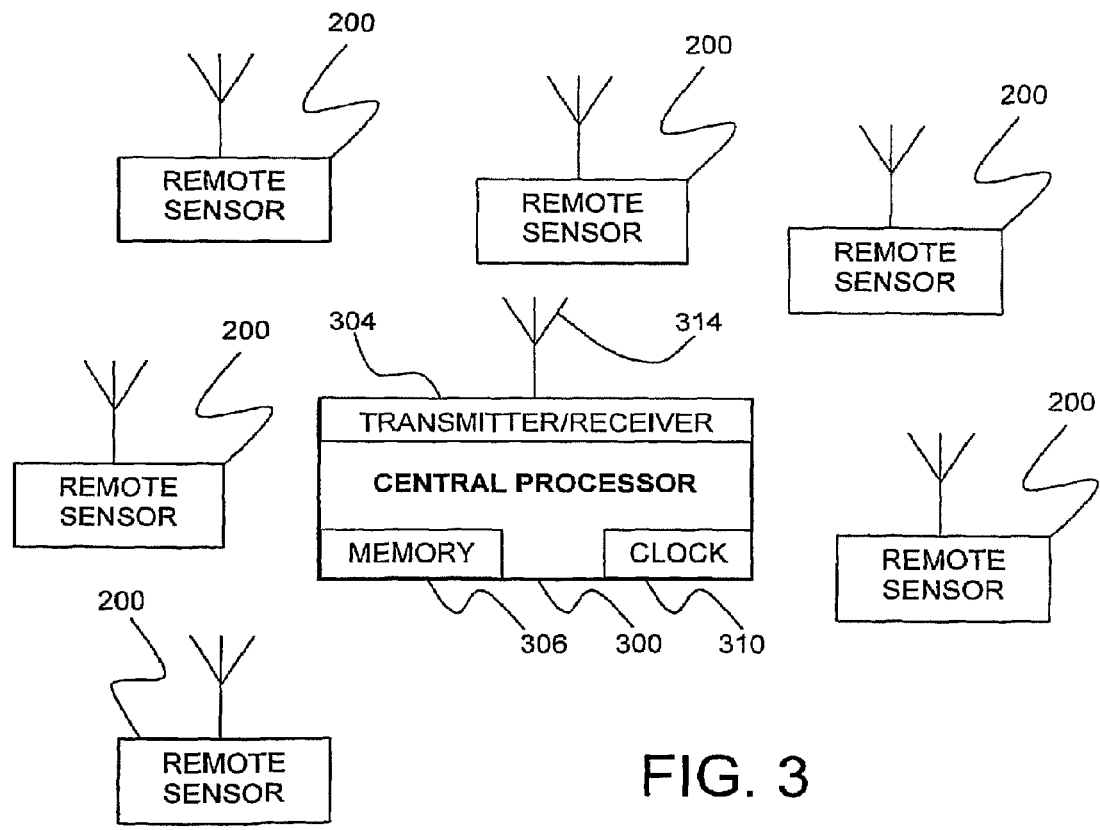
FIG. 3 schematically illustrates a plurality of remote sensors in communication with a central processor.

One aspect of the individual remote sensors 200 that impacts the present methodology is that each of clock 210 associated with individual remote sensors 200 has a local clock speed which may differ from one remote sensor 200 to another. Moreover, the differing speeds of clocks 210 associated with individual remote sensors 200 may also differ from the speed of clock 310 (FIG. 3) associated with a central processor 300 (FIG. 3). This aspect of the present subject matter and methodologies for addressing it in a practical manner will be addressed herein later.

With reference to FIG. 3, it will be seen that, in an exemplary system, a plurality of remote sensors 200 may be provided while only a single central processor 300 may be associated with the plurality of remote sensors 200. In the exemplary environment described here, each of the plurality of remote sensors 200 may be associated with an individual tire or wheel of a vehicle. It should be appreciated that although only six remote sensors 200 have been illustrated in FIG. 3, any number may be employed depending on the data to be collected. In an exemplary configuration, eighteen remote sensors 200 may be provide, one associated with each tire or wheel of an eighteen wheeled vehicle while the central processor 300 may be located in the tractor portion of the vehicle. Alternatively, or in addition, the central processor 300 may be located at a fixed location such as within a transportation terminal so that data from an arriving or departing vehicle may be obtained.

Referring now to the operation of apparatus constructed in accordance with the present subject matter: it will be appreciated from an understanding of the present disclosure that an algorithm and basic measurement architecture has been disclosed that permits after-the-fact or "back-door" transmission of signals for further signal processing.

In an exemplary arrangement in accordance with the present subject matter multiple remote sensors 200 may be provided. Each remote sensor 200 has associated with it at least one transducer 212 and a clock 210. Each clock 210 operates at its own speed. Remote sensors 200 are configured to take measurements via their incorporated transducer 212 corresponding to a single event, multiple events or a series of events.

Measurement activity may be initiated for all remote sensors 200 by a common external stimulus, for example, a transmitted signal from central processor 300 via the transmitter portion of transmitter/receiver 304 and antenna 314 or, in the case of the exemplarily described vehicle system, some other transmitter mounted on or off the vehicle. For example, a transmitter located within or near a transportation terminal may trigger a measurement sequence as a vehicle enters or leaves the terminal. It should be further appreciated that the measurement sequence may be triggered automatically via, for example, a condition responsive system or manually. An exemplary condition responsive triggering of a measurement sequence may involve detection of the presence of a vehicle within a specific area. The measurement sequence may be ended in a similar fashion by transmission and reception of another signal or by operation of a timer incorporated into remote sensors 200.

In accordance with one aspect of the present subject matter this initiation and termination of measurement by all remote sensors 200 does not have to be precisely accomplished. All remote sensors 200 simply have to actively measure the phenomena of interest for at least the phenomena comparison window 104. A record of the measurement is written locally in the remote sensor 200 memory 206. This record may correspond to a single event, multiple events, or a continuous measurement for a defined time interval. In an exemplary case, the measurement may correspond to the detection and recognition of an event by threshold or waveform. In other embodiments, the record may correspond to a continuous measurement transducer output from the beginning to end of a measured phenomenon.

At some time $t_4$ (FIG. 1) following the measurement activity 102 period, each remote sensor 200 transmits plural data items including its unique ID 202, a signal representative of its individual clock speed, and the elapsed time since an individual measurement event to central processor 300. The transducer output may also be transmitted in cases where continuous measurement is desired. Data transmission from remote sensors 200 may be triggered by yet another signal from central processor 300 or may occur automatically based on predetermined time delays following measurement activity 102. Alternatively data transmission starting at time $t_4$ may be triggered by an off vehicle transmitter at a transportation terminal or other location.

The individual ID 202, of course, identifies that particular remote sensor 200 whose data is being transmitted. A clock speed signal from individual remote sensor 200's clock 210 may correspond to a predetermined signal that may be compared with a similar predetermined speed signal of central processor 300's clock 310. For example, the signal may correspond to a unit increment of time as determined by individual clocks 210 which may then be compared and normalized with a similarly defined unit increment of time as determined by clock 310 associated with central processor 300. The difference in elapsed time since an individual measurement as recorded by the remote sensors 200 may then be used to normalize the remote sensor's time to the central processor's time. The elapsed time since an individual measurement may be updated with each transmission from the remote sensor 200 to the central processor 300.

It should be appreciated by those of ordinary skill that the term "normalize" used herein contemplates a broader, aspect than simply adjusting values relative to a unit value. In the present context, normalizing may encompass such unit value adjustments but may also encompass shifts in time marks between different sensors' internal clocks and clock signals developed for a central processor in order to properly evaluate similar specifically identified events detected at two or more locations. The term may also connote other types of signal alignments where proper evaluation of signals from plural locations may require adjustments in signal amplitude, phase, time displacement or some other parameter in order to provide effective signal evaluation.

In order to overcome potential transmission collisions, repeated transmissions from the various remote sensors 200 may be required. In the event that synchronization of signals is accomplished using a signal correspond to a unit increment of time as determined by individual clocks 210, central processor 300 may be configured to accept only one good transmission for each unique remote sensor ID. By limiting the number of required good transmissions to one, and by allowing randomized transmissions from individual remote sensors 200, significant reduction in potential transmission collisions may be realized.

Alternatively central processor 300 may be configured to accept at least two transmissions for each unique ID thereby permitting a direct comparison of individual clock speed elapsed time between successive transmissions with the central processor elapsed time between the same successive transmissions. This alternative approach may be useful in instances where tire environmental conditions may have an effect on the frequency of oscillation of the individual clocks 210.

As previously mentioned, it is possible that the remote sensor output can be transmitted in cases where continuous measurement is desired. With this data, central processor 300 will normalize all clock speeds and determine the relative time or sequence of each independently measured or recorded event for all remote sensor local measurements.

The synchronization methodology of the present technology is most effective with a predominantly linear time correlation between any individual clock 210 and the clock 310 employed in central processor 300 and achieves best results for relatively short measurement windows. For longer measurement windows, where a predominantly linear assumption may not be valid, the measurement window may be segmented to the point that a linear assumption becomes valid for the type of clock employed. For shorter measurement windows, segmentation may provide improved accuracy by further compensating for any differences between individual clock 210 and central processor clock 310. Under a segmented approach, individual segments would be defined in a manner similar to that previously defined and the comparison results combined to evaluate the longer measurement window.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for synchronizing data, comprising:
providing a plurality of remote sensors, each remote sensor including a transducer, a transmitter, a receiver, and a remote sensor clock having an operating speed;
providing a central processor, the central processor including a processor, a transmitter, a receiver, and a central processor clock having an operating speed;
transmitting a signal from the central processor to each of the plurality of remote sensors to initiate a common measurement period at each of the plurality of remote sensors based on the transmitted signal from the central processor, each of the plurality of remote sensors performing a measurement event during the common measurement period;
receiving a remote sensor signal from each of the plurality of remote sensors at the central processor, the remote sensor signal including a first portion indicative of the operating speed of the remote sensor clock and a second portion indicative of the elapsed time since any measurement event during the measurement period;
normalizing the remote sensor signals received at the central processor from each of the plurality of remote sensors based on the operating speed of the central processor clock; and
determining with the central processor the relative time of each measurement event for the plurality of remote sensors based on the second portion of the remote sensor signals received from the plurality of remote sensors indicative of the elapsed time since any measurement event during the measurement period.

2. The method of claim 1, further comprising:
assigning a unique identification to each of the plurality of remote sensors; and
transmitting the unique identification to the central processor.

3. The method of claim 1, wherein the first portion of the remote sensor signal indicative of the operating speed of the clock comprises a signal indicative of a unit increment of time.

4. The method of claim 1, further comprising:
transmitting a second signal from the central processor to each of the plurality of remote sensors; and
terminating the measurement period at each of the plurality of remote sensors based on the second signal transmitted from the central processor.

5. The method of claim 1, wherein the measurement period at each of the plurality of remote sensors is initiated simultaneously.

6. The method of claim 1, further comprising:
terminating the measurement period at each of the plurality of remote sensors a predetermined time following initiation of the measurement period.

7. The method of claim 1, further comprising:
segmenting the common measurement period to permit simplification of signal evaluation for longer measurement periods and improved accuracy for shorter measurement periods.

8. The method of claim 1, wherein the plurality of remote sensors perform the measurement event during a phenomenon comparison window during the common measurement period.

9. The method of claim 8, wherein each remote sensor signal is received at the central processor after termination of the common measurement period.

10. The method of claim 8, wherein each remote sensor signal is received at the central processor at different times after termination of the common measurement period.

11. The method of claim 10, wherein the method comprises comparing measurement events performed by each of the plurality of remote sensors during the phenomenon comparison window.

12. The method of claim 1, wherein each of the plurality of remote sensors is mounted in a tire.

13. The method of claim 12, wherein the measurement event measures tire related phenomena.

* * * * *